US011396891B2

(12) United States Patent
Passrucker et al.

(10) Patent No.: US 11,396,891 B2
(45) Date of Patent: Jul. 26, 2022

(54) COMPRESSOR

(71) Applicant: MAN Energy Solutions SE, Augsburg (DE)

(72) Inventors: Harald Passrucker, Salzburg (AT); Klaus Breitschwerdt, Groebenzell (DE); Bjoern Grueber, Eichenau (DE); Thorsten Poehler, Dinslaken (DE)

(73) Assignee: Man Energy Solutions SE, Augsburg (DE)

( * ) Notice: Subject to any disclaimer, the term of this patent is extended or adjusted under 35 U.S.C. 154(b) by 934 days.

(21) Appl. No.: 15/038,968

(22) PCT Filed: Nov. 14, 2014

(86) PCT No.: PCT/DE2014/000582
§ 371 (c)(1),
(2) Date: Dec. 19, 2016

(87) PCT Pub. No.: WO2015/078428
PCT Pub. Date: Jun. 4, 2015

(65) Prior Publication Data
US 2017/0114802 A1    Apr. 27, 2017

(30) Foreign Application Priority Data

Nov. 26, 2013 (DE) .......................... 102013224081.3

(51) Int. Cl.
*F04D 29/66* (2006.01)
*F04D 29/32* (2006.01)
(Continued)

(52) U.S. Cl.
CPC ........... *F04D 29/666* (2013.01); *F01D 5/141* (2013.01); *F01D 5/26* (2013.01); *F04D 29/321* (2013.01);
(Continued)

(58) Field of Classification Search
CPC . F01D 1/04; F01D 5/141; F01D 5/142; F01D 5/26; F01D 5/16; F01D 9/041;
(Continued)

(56) References Cited

U.S. PATENT DOCUMENTS 3,006,603 A * 10/1961 Caruso .................... F01D 5/043
415/1
4,008,000 A    2/1977 Gradl et al.
(Continued)

FOREIGN PATENT DOCUMENTS

CN    1654805    8/2005
CN    101666327 A    3/2010
(Continued)

OTHER PUBLICATIONS

Chinese Office Action, dated Mar. 9, 2017, Priority Document.
(Continued)

*Primary Examiner* — Topaz L. Elliott
*Assistant Examiner* — Jackson N Gillenwaters
(74) *Attorney, Agent, or Firm* — Greer, Burns & Crain, Ltd.

(57) ABSTRACT

A compressor, in particular, of a turbomachine. The compressor comprises at least one blade ring and at least two ring segments, wherein the blade ring has at least two equally large ring segments. The compressor also comprises blades, which are arranged in the ring segments of the blade ring in such a way that a first number of blades is arranged in a first ring segment and a second number of blades is arranged in a second ring segment. The first number of blades is not equal to the second number of blades.

10 Claims, 1 Drawing Sheet

(51) Int. Cl.
*F01D 5/14* (2006.01)
*F01D 5/26* (2006.01)

(52) U.S. Cl.
CPC ......... *F05D 2260/961* (2013.01); *Y02T 50/60* (2013.01)

(58) Field of Classification Search
CPC .......... F01D 9/042; F01D 25/06; F04D 19/02; F04D 29/321; F04D 29/324; F04D 29/542; F04D 29/661; F04D 29/666; F04D 29/663; F04D 29/668; F05D 2260/96; F05D 2260/961; F05B 2260/96
USPC .............................. 416/198 A; 415/193–195
See application file for complete search history.

(56) References Cited

U.S. PATENT DOCUMENTS

| | | | | |
|---|---|---|---|---|
| 6,139,275 A * | 10/2000 | Noda | ................... | F04D 29/666 415/119 |
| 6,379,112 B1 | 4/2002 | Montgomery | | |
| 6,402,458 B1 * | 6/2002 | Turner | ................... | F01D 5/142 415/1 |
| 7,743,497 B2 * | 6/2010 | Gautreau | ................ | F01D 9/041 29/888.021 |
| 7,891,943 B2 * | 2/2011 | Tsuchiya | ................. | F01D 5/141 415/195 |
| 8,087,253 B2 * | 1/2012 | Ning | ....................... | F02C 7/125 60/806 |
| 8,206,097 B2 * | 6/2012 | Nagai | ................... | F04D 29/544 415/195 |
| 8,297,919 B2 * | 10/2012 | Ning | ........................ | F01D 9/04 415/193 |
| 8,534,991 B2 * | 9/2013 | Topol | ................... | F04D 29/544 415/119 |
| 8,684,685 B2 * | 4/2014 | Delvaux | ............... | F04D 29/328 415/195 |
| 10,094,223 B2 * | 10/2018 | Yu | .......................... | F01D 5/142 |
| 10,302,100 B2 * | 5/2019 | Xu | ........................ | F04D 29/666 |
| 10,927,851 B2 * | 2/2021 | Xu | ............................ | F01D 5/16 |
| 2005/0198941 A1 | 9/2005 | Bart | | |
| 2009/0169371 A1 * | 7/2009 | Tsuchiya | ................. | F01D 5/141 415/193 |
| 2010/0054929 A1 | 3/2010 | Ning et al. | | |
| 2010/0068044 A1 * | 3/2010 | Nagai | ................... | F04D 29/522 415/182.1 |
| 2010/0111684 A1 * | 5/2010 | Ning | ....................... | F01D 5/142 415/193 |
| 2011/0123342 A1 * | 5/2011 | Topol | ........................ | F01D 5/16 416/223 R |
| 2012/0099996 A1 | 4/2012 | Delvaux | | |
| 2013/0108452 A1 | 5/2013 | Penny | | |
| 2013/0149135 A1 * | 6/2013 | Hield | ...................... | F01D 9/041 415/208.2 |
| 2014/0241866 A1 * | 8/2014 | Smith | ................... | F04D 29/284 415/185 |
| 2016/0017796 A1 * | 1/2016 | Xu | .......................... | F01D 5/143 415/208.2 |

FOREIGN PATENT DOCUMENTS

| | | |
|---|---|---|
| CN | 103089321 | 5/2013 |
| DE | 10326533 | 1/2005 |
| DE | 102011054550 | 1/2012 |
| DE | 102011054550 | 4/2012 |
| DE | 102011054550 A1 | 4/2012 |
| EP | 1580400 A1 | 9/2005 |
| RU | 2008100718 A | 7/2009 |
| RU | 2476729 C1 | 2/2013 |

OTHER PUBLICATIONS

International Search Report, dated Feb. 4, 2015, priority document.
Search results from corresponding Russian application dated May 5, 2018.
Supplementary search report from corresponding Chinese application No. 201480073755.2, dated Jan. 23, 2018.
Search results from corresponding German application No. 102013224081.3.

* cited by examiner

COMPRESSOR

CROSS-REFERENCES TO RELATED APPLICATIONS

This application claims the benefit of the German patent application No. 10 2013 224 081.3 filed on Nov. 26, 2013, the entire disclosures of which are incorporated herein by way of reference.

BACKGROUND OF THE INVENTION

The invention relates to a compressor, for example, a fluid kinetic machine as described in the document DE 103 26 533 A1.

First, such a compressor can be installed in combination with a combustion chamber and a turbine in a gas turbine, for example. Second, however, such a compressor can also be constructed as an independent module to be driven by an independent machine.

In rotation of a bladed rotor with respect to a stationary stator, in particular a stationary housing or stationary blades, the stationary modules are excited to vibration by the movement of the rotor and the blades of the rotor are excited to vibration by the stationary modules. However, vibrations within the fluid kinetic machine, in particular a gas turbine and/or a jet engine, are a disadvantage because gas turbine modules are exposed to a higher load and thus to greater wear as a result of vibrations. Resonant vibrations, in particular, must be prevented.

With the state of the art referenced above, the blades of a rotor have different spacings (blade pitch spacing). Unfortunately this approach is not suitable for repeating stages, because with this approach the resonant vibration between the steps is not taken into account. Repeating steps are compressor steps whose blades are identical and are arranged one after the other. In the technical world we speak of "clocked" stages. The different stages typically have the same pitch. In general, this means that the excitation arrangement of the oncoming flow and the outgoing flow of each repeating stage are identical.

SUMMARY OF THE INVENTION

Thus an object of the present invention is to provide an approach which will avoid blade vibration, in particular in repeating stages of a compressor.

This object is achieved by the features of claim 1.

The invention relates to a compressor, in particular of a fluid kinetic machine. This compressor includes at least one blade ring, at least two ring segments, wherein the blade ring is divided into at least two ring segments, in particular, of the same size. Furthermore, the compressor comprises blades which are arranged in ring segments of the blade ring in such a way that a first number of blades are arranged in a first ring segment and a second number of blades are arranged in a second ring segment. The first number of blades is not equal to the second number of blades. Segments in blade rings may preferably occur in pairs.

In another advantageous embodiment of the invention, the compressor comprises at least two stages, each stage having a rotor blade ring and a guide vane ring.

In another advantageous embodiment of the invention, each guide vane ring is divided into at least two ring segments, in particular, of the same size.

In another advantageous embodiment of the invention, each rotor blade ring is divided into at least four ring segments, in particular, of the same size.

This is advantageous, in particular, because this creates a phase shift in the flow at the circumference so that an excitation of vibration of the guide vane as well as the rotor blades is reduced.

In an advantageous embodiment of the invention, the distances between the blades of the first ring segment are the same and/or the distances between the blades of the second ring segment are the same. This is advantageous, in particular, because in the case of two-piece housings (split cases), in particular, with industrial gas turbines or compressors in process engineering plants, the first ring segment is arranged in the top half of the housing and the second ring segment is arranged in the bottom half of the housing. Guide vane ring segments, in particular, may thus be provided with different numbers of blades on a grating. For example, the upper ring segment will have X blades and the lower ring segment will have X+a blades, where the following relationships hold: $a \neq 0$ and $X > 2$.

In another advantageous embodiment of the invention, the compressor comprises an additional blade ring having at least two additional ring segments, wherein the additional blade ring is divided into at least two additional ring segments, in particular of the same size, which in turn have additional blades. It should be pointed out that the blade rings may be both guide vane rings and rotor blade rings. Furthermore, the additional blade ring for rotor blades may be divided into at least four additional ring segments, in particular, of the same size.

In another advantageous embodiment of the invention, the second additional ring segment has the first number of additional blades and/or the first additional ring segment has the second number of additional blades. This is advantageous, in particular, because at least one additional phase shift of the flow on the circumference can be introduced beyond the mesh.

In another advantageous embodiment of the invention, the angle positioning of the first ring segment on the blade ring is identical to the angle positioning of the second additional ring segment on the additional blade ring.

This is advantageous, in particular, because at least one additional phase shift of the flow can be introduced at the circumference over the compressor stages.

In another advantageous embodiment of the invention, the angular positioning of the second ring segment on the blade ring is identical to the angular positioning of the first additional ring segment on the additional blade ring. It is particularly advantageous that at least one additional phase shift of the flow on the circumference can be introduced over the compressor stages without having to alter the number of blades of the corresponding mesh.

In another advantageous embodiment of the invention, the two blade rings are twist-secured relative to one another. If the blade rings are rotor blade rings, then these are connected to one another by means of the main shaft of the fluid kinetic machine. If the blade rings are guide vane rings, then they are connected to one another via the housing of the fluid kinetic machine.

BRIEF DESCRIPTION OF THE DRAWINGS

Preferred exemplary embodiments of the invention are described in greater detail below on the basis of the schematic drawings, in which.

DETAILED DESCRIPTION OF THE PREFERRED EMBODIMENTS

Figure 1:
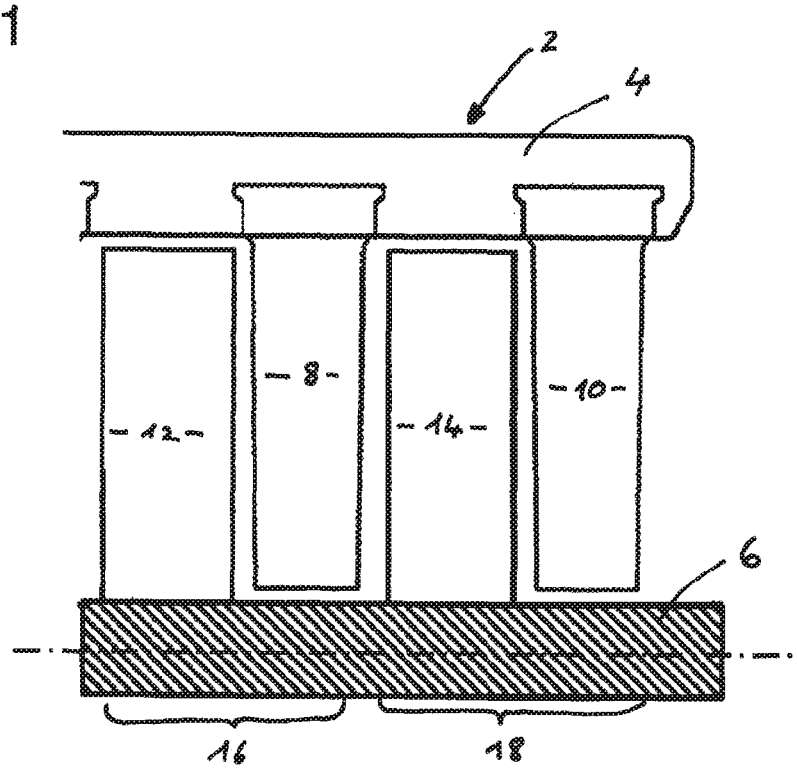
FIG. 1: shows a longitudinal section through a compressor.

FIG. 1 shows a longitudinal section through a compressor 2. A housing 4 runs horizontally in the upper area and the main shaft 6 runs in the lower area. The first guide vane ring 8 and the second guide vane ring 10 are mounted on the housing 4, but only one of the guide vanes is visible, running vertically here in FIG. 1. The first rotor blade ring 12 and the second rotor blade ring 14 are mounted on the main shaft 6, but only one of the rotor blades is visible here, running vertically in the figure. The first rotor blade ring 12 and the first guide vane ring 8 form a compressor stage 16, for example, the first compressor stage here. The second rotor blade ring 14 and the second guide vane ring 10 form another compressor stage 18, here, for example, the second compressor stage. It should be pointed out that the compressor stages need not necessarily be arranged directly side by side so that at least one other compressor stage may be present between the compressor stages 16 and 18 shown here.

Figure 2:
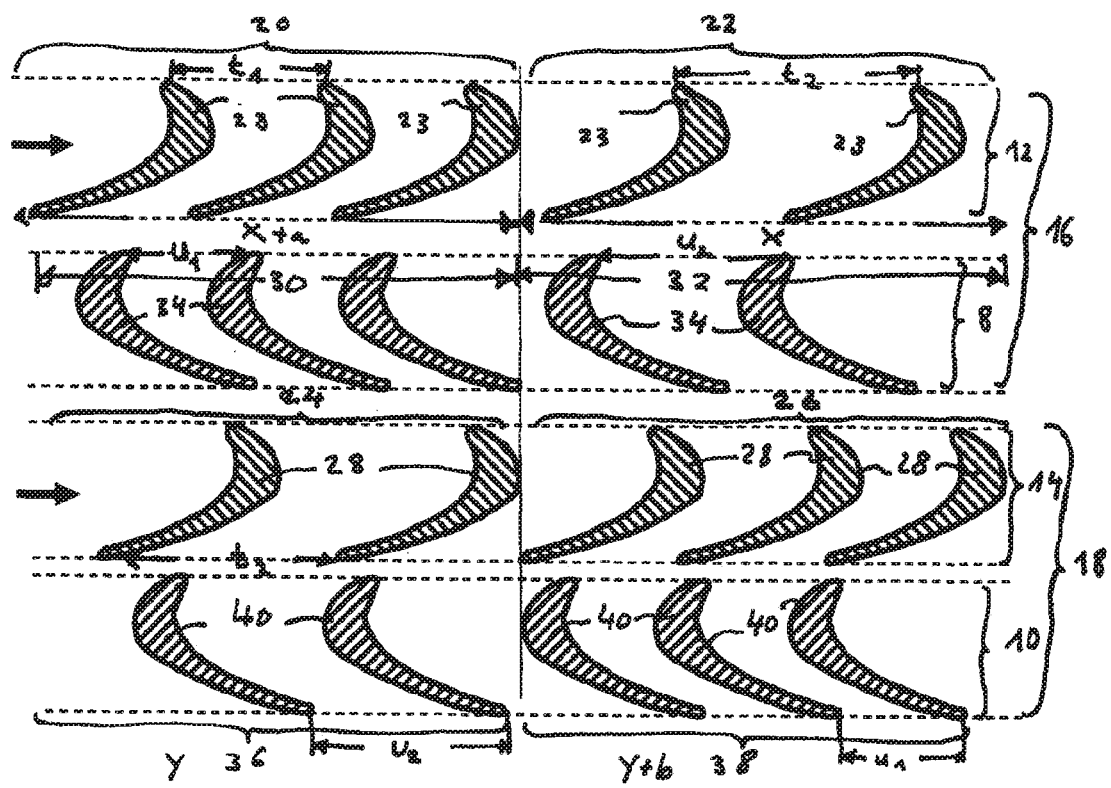
FIG. 2: shows a developed view of two stages of the above compressor.

FIG. 2 shows a top view of the development of the two compressor stages 16, 18 from FIG. 1. The lateral surface of all four laid rings 8 through 14 is shown in a horizontal developed view. The first row shows the first rotor blade ring 12, the second row shows the first guide vane ring 8, the third row shows the second rotor blade ring 14 and the fourth row shows the second guide vane ring 10.

The first rotor blade ring 12 here is preferably divided into two or four ring segments 20 and 22 of the same size. The direction of rotation of the rotor blade ring 12 is indicated with an arrow at the far left. These may, in fact, be separable components so that one ring segment preferably covers a circumference of 90° or 180°. The first ring segment 20 of the rotor blade ring 12 comprises a first number X+a of rotor blades 23, and the second ring segment 22 of the rotor blade ring 12 comprises a second number X of rotor blades 23 wherein the following relationships hold in FIG. 2: X=2 and a=1. It is only necessary for the following conditions to be met: X≥2 and a>0. The rotor blades 23 in the first ring segment 20 have a first pitch t1. The rotor blades 23 and the second ring segment 22 have a second pitch t2, wherein the second pitch t2 is greater than the first pitch t1 as can be seen in FIG. 2. It should be pointed out that the term "pitch" is understood to refer to the distance between two neighboring blades. In FIG. 2 this refers to the distance t1, t2; u1, u2 in the circumferential direction between the two front edges of the blades. Ring segments with the same pitch should preferably be arranged opposite one another for the sake of balance.

For the second rotor blade ring 14 the same thing applies as for the first rotor blade ring 12. The second rotor blade ring 14 here is also preferably subdivided into two ring segments 24 and 26 of the same size. There may, in fact, be two separable components so that one ring segment preferably covers a circumference of 180°. The first ring segment 24 of the rotor blade ring 14 comprises the second number X of rotor blades 28, and the second ring segment 26 of the rotor blade ring 14 comprises the first number X+a of rotor blades 24, wherein the following holds in FIG. 2: X=2 and a=1. Only the following conditions must be met: X≥2 and a>0. The rotor blades 28 in the first ring segment 24 have the second pitch t2. The rotor blades 28 in the second ring segment 26 have the first pitch t1, wherein as shown in FIG. 2, the second pitch t2 is greater than the first pitch t1. The rotor blade ring 12 of the first compressor stage 16 is thus designed as the opposite of the rotor blade ring 14 of the next compressor stage 18 (the second here). It is now conceivable that the rotor blade ring of the third compressor stage (not shown) has the same rotor blade distribution of the first rotor blade ring 12. Thus, the rotor blade rings of the uneven compressor stages may have the blade configuration of the first rotor blade ring 12 and the rotor blade rings of the even compressor stages may have the blade configuration of the second rotor blade ring 14. Since the rotor blade rings of a high-pressure compressor are connected to the main shaft 6, for example, their positions relative to one another do not change so that these rotor blade rings always have a configuration that is rotated by 180° from the first stage.

The first guide vane ring 8 here is preferably subdivided into two ring segments 30 and 32 of the same size. Since the guide vane ring 8 does not rotate, there is no arrow at the left such as that shown with the rotor blade rings 12 and 14. In fact, these may be two separable components so that one ring segment preferably covers a circumference of 180°. The first ring segment 30 of the guide vane ring 8 includes a first number Y+b of guide vanes 34, and the second ring segment 32 of the guide vane ring 8 includes a second number Y of guide vanes 34, wherein the following holds in FIG. 2: Y=2 and b=1. It is only necessary to satisfy the following conditions: Y≥2 and b>0. The guide vanes 34 in the first ring segment 30 have a first pitch u1. The guide vanes 34 in the second ring segment 32 have a second pitch u2, wherein, as FIG. 2 shows, the second pitch u2 is greater than the first pitch u1.

The second guide vane ring 10 here is also preferably subdivided into two ring segments 36 and 38 of the same size. These may, in fact, be two separable components so that one ring segment preferably covers a circumference of 180°. The first ring segment 36 of the second guide vane ring 10 includes the second number Y of guide vanes 40, and the second ring segment 38 of the second guide vane ring 10 comprises the first number Y+b of guide vanes 40, wherein the following holds in FIG. 2: Y=2 and b=1. Only the following conditions must be met: Y≥2 and b>0. The guide vanes 40 in the first ring segment 36 have the second pitch u2. The guide vanes 40 in the second ring segment 38 have the first pitch u1, wherein as FIG. 2 shows the second pitch u2 is greater than the first pitch u1. The guide vane ring 8 of the first compressor stage 16 is thus designed the opposite of the guide vane ring 10 of the next compressor stage 18 (the second here). It is now conceivable for the guide vane ring of the third compressor stage (not shown) to have the same guide vane distribution of the first guide vane ring 8. Thus, the guide vane rings of the odd-numbered compressor stages may have the blade configuration of the first guide vane ring 8 and the guide vane rings of the even-numbered compressor stages may have the blade configuration of the second guide vane ring 10. Since the guide vane rings of a high-pressure compressor, for example, are connected to the housing 4, there is no change in their position relative to one another so that these guide vane rings always have a configuration that is rotated by 90° from one stage to the next stage.

Due to this blade configuration, vibrations can be prevented and thus the corresponding component may be designed to be thinner so that weight can be saved on such a compressor according to the invention in the fluid kinetic machine.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE NUMERALS 2 compressor
4 housing
6 main shaft
8 first guide vane ring
10 second guide vane ring
12 first rotor blade ring
14 second rotor blade ring
16 first compressor stage
18 second compressor stage
20 first ring segment of 12
22 second ring segment of 12
23 blades of 12
24 first ring segment of 14
26 second ring segment of 14
28 blades of 14
30 first ring segment of 8
32 second ring segment of 8
34 blades of 8
36 first ring segment of 10
38 second ring segment of 10
40 blade of 10
X+a; Y+b a first number of blades
X; Y a second number of blades

The invention claimed is:

1. A compressor comprising:
at least one first blade ring of a first compressor stage and formed of at least two ring segments being separable components,
blades which are arranged in the ring segments of the blade ring in such a way that a first number of blades are arranged in a first ring segment and a second number of blades are arranged in a second ring segment, wherein the first number of blades is not equal to the second number of blades;
a further blade ring of a further compressor stage and formed of at least two further ring segments being separable components with blades, wherein a number of blades of a first segment of the further ring coincides with said second number, and a number of blades of a second segment of the further ring coincides with said first number,
wherein a total number of blades in the at least one first blade ring is equal to a total number of blades in the further blade ring,
wherein the first ring segment of the at least one first blade ring and the second ring segment of the further blade ring are arranged opposite each other around an axis of rotation, and,
wherein the second ring segment of the at least one first blade ring and the first ring segment of the first blade ring are arranged opposite each other around the axis of rotation.

2. The compressor according to claim 1, wherein at least one of:
the blades of the first ring segment are equidistant, or
the blades of the second ring segment are equidistant.

3. The compressor according to claim 1, wherein an angular positioning of the first ring segment on the first blade ring is identical to an angular positioning of said second one of the further ring segments on the further blade ring.

4. The compressor according to claim 1, wherein an angular positioning of the second ring segment on the first blade ring is identical to an angular positioning of said first one of the further ring segments on the further blade ring.

5. The compressor according to claim 1, wherein at least one of:
the first blade ring has only two ring segments, or
the further blade ring has only two further ring segments.

6. The compressor according to claim 1, wherein at least one of the blades of the first blade ring or the blades of the further blade ring are at least one of rotor blades or guide vanes.

7. The compressor according to claim 1, wherein each of the compressor stages has a rotor blade ring and a guide vane ring.

8. The compressor according to claim 7, wherein each guide vane ring is divided into at least two ring segments of the same size.

9. The compressor according to claim 7, wherein each rotor blade ring is divided into at least four ring segments of the same size.

10. A fluid kinetic machine having a compressor according to claim 1 and a turbine.

* * * * *